United States Patent
Johnson et al.

(10) Patent No.: US 6,565,044 B1
(45) Date of Patent: May 20, 2003

(54) COMBINATION SOLAR SAIL AND ELECTRODYNAMIC TETHER PROPULSION SYSTEM

(75) Inventors: Charles L. Johnson, Madison, AL (US); Gregory L. Matloff, Brooklyn, NY (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/097,698

(22) Filed: Mar. 14, 2002

(51) Int. Cl.⁷ ............................... B64G 1/40; B64G 1/42
(52) U.S. Cl. .................... 244/172; 244/158 R; 244/173
(58) Field of Search ........................... 244/158 R, 173, 244/166, 168, 172, 159

(56) References Cited

U.S. PATENT DOCUMENTS

| | | | | |
|---|---|---|---|---|
| 3,061,239 A | * | 10/1962 | Rusk | |
| 3,152,260 A | * | 10/1964 | Cummings | |
| 3,681,583 A | * | 8/1972 | Kubo et al. | |
| 4,614,319 A | | 9/1986 | Drexler | |
| 6,194,790 B1 | * | 2/2001 | Griffin et al. | |
| 6,419,191 B1 | * | 7/2002 | Hoyt et al. | |

FOREIGN PATENT DOCUMENTS

| | | | | |
|---|---|---|---|---|
| GB | 2122965 | * | 1/1984 | ............... 244/168 |
| RU | 2002682 | * | 11/1993 | ............... 244/168 |

OTHER PUBLICATIONS

Johnson, L., Leifer, Stephanie; Interstellar Exploration: Propulsion Options for Precursors and Beyond.

Garner, Layman, Gavit, & Knowles; A Solar Sail Design for a Mission to the Near–Interstellar Medium.

Gallagher, Johnson, Moore, & Bagenal; Electrodynamic Tether Propulsion and Power Generation at Jupiter; NASA/TP 208475; Jun. 1998.

Johnson, Estes, Lorenzini, Martinez–Sanchez, Sanmartin, & Vas; Electrodynamic Tethers for Spacecraft Propulsion; AIAA; 36th Aerospace Sciences Meeting & Exhibit; Jan. 12–15, 1998; Reno, NV; American Institute of Aeronautics and Astronautics, Reston, VA.

Matloff, Gregory L.; Persephone: A Non–Nuclear Rendezvous Mission to a Kuiper Belt Object; Space Technology and Applications International Forum—2001; CP552; pp. 612–617; 2001 American Institute of Physics.

* cited by examiner

*Primary Examiner*—Charles T. Jordan
*Assistant Examiner*—Tien Dinh
(74) *Attorney, Agent, or Firm*—James J. McGroary; Larry W. Brantley

(57) ABSTRACT

A propulsion system for a spacecraft includes a solar sail system and an electrodynamic tether system. The solar sail system is used to generate propulsion to propel the spacecraft through space using solar photons and the electrodynamic tether system is used to generate propulsion to steer the spacecraft into orbit and to perform orbital maneuvers around a planet using the planet's magnetic field. The electrodynamic tether system can also be used to generate power for the spacecraft using the planet's magnetic field.

2 Claims, 4 Drawing Sheets

COMBINATION SOLAR SAIL AND ELECTRODYNAMIC TETHER PROPULSION SYSTEM

The invention described herein was made in the performance of work under a NASA contract and is subject to the provision of Public Law 96-517 (35 U.S.C. 202) in which the contractor has elected not to retain title.

Be it known that I, Les Johnson, a citizen of the United States, residing at 218 Brett Drive, Madison, Ala. 35758, and Gregory Matloff, a citizen of the United States, residing at 417 Greene Avenue, Brooklyn, N.Y. 11216, have invented a new and useful "Combination Solar Sail And Electrodynamic Tether Propulsion System."

BACKGROUND OF THE INVENTION

The present invention relates generally to systems and methods for traveling through space. More particularly, this invention pertains to a system and method for traveling through space using solar sails and electrodynamic tethers.

Solar sail propulsion systems for traveling through space are known in the art. For example, the document entitled "Interstellar Exploration: Propulsion Options For Precursors And Beyond," authored, in part, by the first applicant of the present invention, teaches the use of a solar sail propulsion system to propel a spacecraft through space. Another document, entitled "A Solar Sail Design For A Mission To The Near-Interstellar Medium," discloses a specific design for a solar sail propulsion system to propel a spacecraft into near-interstellar space. In addition, U.S. Pat. No. 4,614,319, issued to Drexler on Sep. 30, 1986 and entitled "Solar Sail," also teaches the use of a solar sail propulsion system. The contents of the above-referenced documents are hereby incorporated by reference into this application.

Solar sail propulsion systems typically include a large, flat, thin, reflective material supported by a lightweight deployable structure. These systems generate propulsion by transferring the momentum of solar photons reflected by the solar sail to the sail. In other words, propulsion is generated when sunlight strikes and is reflected off of the solar sail.

Solar sail propulsion systems have several advantages. First, such systems do not require the use of propellants to generate propulsion. As a result, a spacecraft can be made lighter or, alternatively, the spacecraft payload carrying capacity can be increased. Second, systems using solar sails to generate propulsion can reach speeds that are much faster than speeds reached by conventional propellant-type propulsion systems. As a result, solar sail propulsion systems can reach planets far away from the Earth in a much shorter time period.

Unfortunately, solar sail propulsion systems also have a significant disadvantage. Solar sails rely on the sun, and the sunlight that it produces, for propulsion and cannot generate sufficient thrust when the solar sail moves too far away from the sun, typically approximately 5 Astronomical Units (AU). As a result, solar sails cannot be used to steer a spacecraft into orbit or to perform orbital maneuvers around a planet, such as Jupiter or Saturn, which is very far away from the sun.

Furthermore, conventional propellant-type propulsions systems, which might be used to steer a spacecraft into orbit or to perform orbital maneuvers around such a planet, are not a desirable solution to this problem because these systems require the use of propellants. Recall that one of the primary advantages of using a solar sail propulsion system is to eliminate the necessity of carrying propellants on the spacecraft. If a conventional propellant-type propulsion system were used, then one of the primary advantages of using a solar sail propulsion system would be lost.

What is needed, then, is an improved solar sail propulsion system that provides sufficient propulsion to steer a spacecraft into orbit and to perform orbital maneuvers around planets that are so far away from the sun that the solar sail is no longer effective.

SUMMARY OF THE INVENTION

Accordingly, one object of the present invention is to provide an improved solar sail propulsion system that provides sufficient propulsion to steer a spacecraft into orbit and to perform orbital maneuvers around planets that are so far away from the sun that the solar sail is no longer effective.

Another object of the present invention is to provide an improved solar sail propulsion system that does not require the use of propellants to steer a spacecraft into orbit and to perform orbital maneuvers around planets that are so far away from the sun that the solar sail is no longer effective.

These and other objects, which will become apparent to someone practicing the present invention, are satisfied by the present invention of a combination solar sail and electrodynamic tether system. The combination solar sail and electrodynamic tether system includes a solar sail system for propelling a spacecraft through space using solar photons and an electrodynamic tether system for steering the spacecraft into orbit and through orbital maneuvers around a planet using the planet's magnetic field.

DESCRIPTION OF THE PREFERRED EMBODIMENTS

Figure 1:
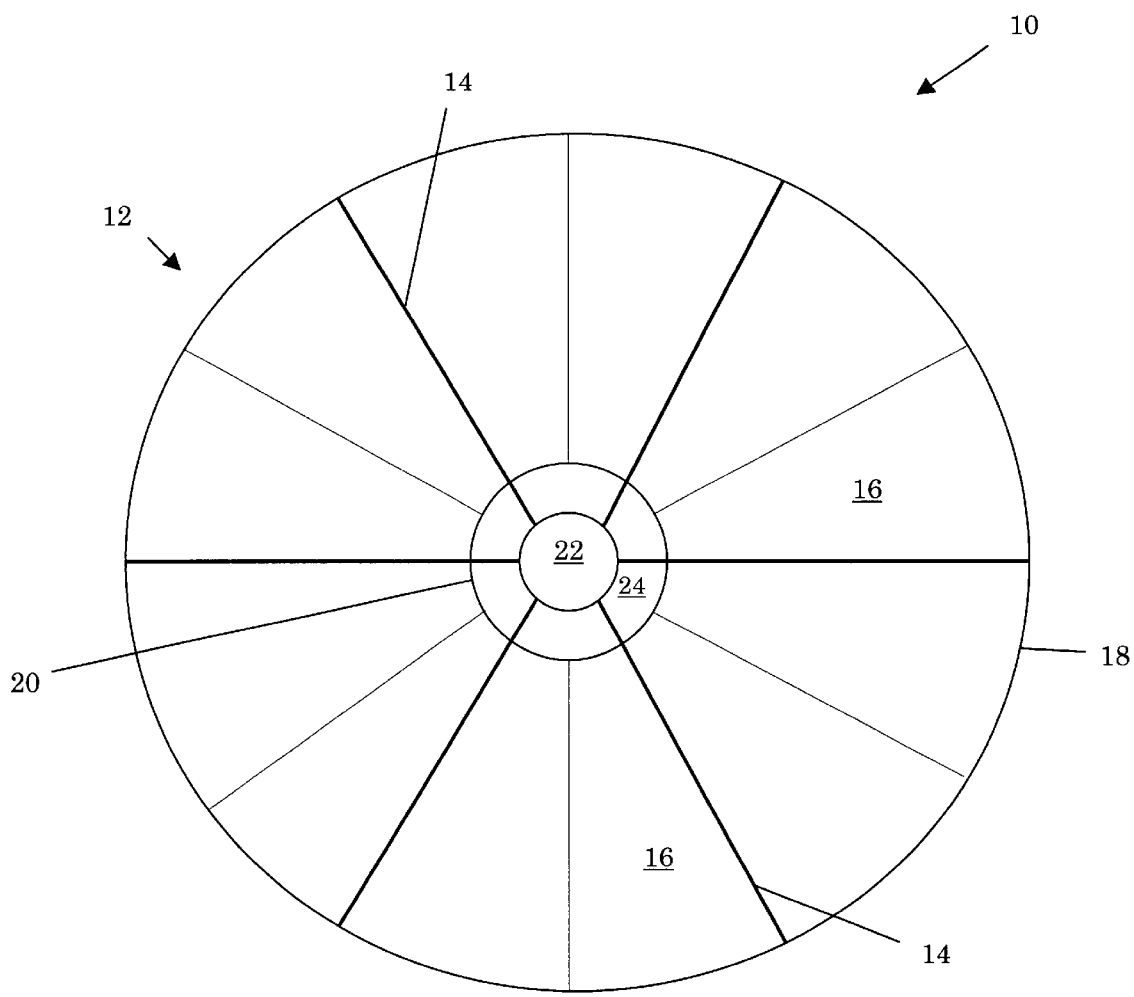
FIG. 1 is a front view of one embodiment of the combination solar sail and electrodynamic tether propulsion system of the present invention.

Referring to FIG. 1, one embodiment of the combination solar sail and electrodynamic tether propulsion system 10 of the present invention includes a spin-stabilized solar sail 12 and multiple electrodynamic tethers 14 embedded in the sail 12. The solar sail 12 includes six (6) pie-shaped gore segments 16, each segment 16 having an outer edge 18 and an inner edge 20. The segments 16 are connected together along the outer edges 18 using connecting tethers (not shown) to form a circular shape and the inner edges 20 are connected to a sail cylinder 22 using connecting tethers (not shown) to form a central opening 24. The electrodynamic tethers 14 are connected on one end to the sail cylinder 22 and extend radially outward to the outer edges 18. In one embodiment, the solar sail 12 has a diameter of approximately 410 meters and the electrodynamic tethers 14 are approximately 200 meters long.

The solar sail 12 is operative to generate propulsion for a spacecraft (not shown) connected to the system 10 by transferring to the solar sail 12 the momentum from solar photons, i.e., sunlight from the sun, reflected off of the solar sail 12. To reflect solar photons, the solar sail 12 is made out of a very thin film coated with a reflective coating, such as aluminum. With the exception of the embedded electrodynamic tethers 14, the solar sail 12 shown in FIG. 1 is very similar to the solar sail described in detail in the document entitled "A Solar Sail Design For A Mission To The Near-Interstellar Medium," which is hereby incorporated by reference in its entirety. Accordingly, the design and operation of the solar sail 12 will not be discussed in any further detail.

The solar sail 12 includes a solar sail control system (not shown) for controlling the direction of travel of the solar sail 12 through space. In one embodiment, the solar sail control system includes a spacecraft (not shown) connected to the sail cylinder 22 such that it can be moved with respect to the center of the solar sail 12 to provide sail attitude control and thrust vector pointing. Alternative embodiments may include other types of solar sail control systems as well.

The electrodynamic tethers 14, in conjunction with an electrodynamic control system (not shown), are operative to generate propulsion and power for a spacecraft (not shown) connected to the system 10 using a planet's magnetic field (not shown). As is known in the art, a magnetic field exerts a force on a wire carrying a current. Electrodynamic tether systems (essentially electrodynamic tethers and any necessary control system) measure the strength and direction of a planet's magnetic field and adjust the current flowing through the electrodynamic tethers to generate propulsion and power for a spacecraft. The combination solar sail and electrodynamic tether propulsion system of the present invention operates in a similar manner.

The electrodynamic tethers 14 and the electrodynamic control system (not shown) of the present invention are very similar to the electrodynamic tether propulsion system described in detail in NASA document NASA/TP-1998-208475 and entitled "Electrodynamic Tether Propulsion and Power Generation at Jupiter," authored, in part, by the first applicant of the present invention, and hereby incorporated by reference into this application. Additional information regarding the design and operation of electrodynamic tether propulsion systems can be found in the American Institute of Aeronautics and Astronautics (AIAA) document AIAA 98-0983 and entitled "Electrodynamic Tethers For Spacecraft Propulsion," also authored, in part, by the first applicant of the present invention, and hereby incorporated by reference into this application. As a result, the design and operation of the electrodynamic tethers 14 and the electrodynamic tether control system (not shown) of the present invention will not be discussed in any further detail.

The combination solar sail and electrodynamic tether system 10 of the present invention is deployed by packaging the system 10 into a small cylinder (not shown) and launching the system 10 into space using a conventional launch vehicle, such as a Delta II rocket. The system 10 is then deployed using centrifugal forces generated by rotating the cylinder (not shown). The procedures for packaging and deploying a solar sail are described in detail in the document entitled "A Solar Sail Design For A Mission To The Near-Interstellar Medium," which has previously been incorporated by reference into this application, and will not be discussed in further detail.

It is contemplated that the combination solar sail and electrodynamic tether system 10 of the present invention will be used in conjunction with all of the instruments and control systems necessary for traveling through space. For example, conventional spacecraft typically include on-board navigation systems (not shown) for navigating through space and the combination solar sail and electrodynamic tether system 10 of the present invention can be used with such a system. Conventional spacecraft typically include other types of instruments and control systems for traveling through space and the combination solar sail and electrodynamic tether system 10 of the present invention will be used with these systems as well.

The present invention of a combination solar sail and electrodynamic tether system 10 can be used to propel a spacecraft through space using solar photons and to steer the spacecraft into orbit around a planet using the planet's magnetic field. In one specific application contemplated by the applicants of the present invention, the combination solar sail and electrodynamic tether propulsion system 10 of the present invention is used to send a spacecraft to Jupiter. The solar sail 12 is used to accelerate the spacecraft to solar-system escape velocity near the Earth and decelerate it into an elliptical orbit around Jupiter using the electrodynamic tethers 14 and the Jovian magnetosphere. In this application, it is assumed that the total spacecraft mass ($M_{s/c}$) at sail unfurlment is 300 kg, however, alternative embodiments may include spacecraft masses greater than or less than 300 kg.

Following the teachings of G. L. Matloff's 2001 STAIF paper, entitled "Persephone; A Non-Nuclear Rendezvous Mission to a Kuiper Belt Object" and presented during STAIF-2001 at Albuquerque, N.Mex. in February 2001, which is hereby incorporated by reference into this application, acc—acceleration=0.0043 m/sec$^2$ after sail unfurlment. During this acceleration from an Earth-escape trajectory, spacecraft velocity changes from 30 to 42 km/sec relative to the Sun in a 2.8 ×10$^6$ sec or about 1-month time interval. The distance traveled during acceleration is about 10$^8$ km or 0.6 Astronomical Units (AU). Assuming an opaque sail oriented normal to the Sun, acceleration (acc) in MKS units is written:

$$\text{Acc} = (1+k)S_r A_{sail}/(cM_{s/c}) = 0.0043 \text{ m/sec}^2, \quad (1)$$

where k is sail reflectivity (about 0.9), $A_{sail}$ is the sail area, $S_r$ is the solar constant (about 1400 watt/m$^2$), and c is the speed of light (300,000 km/sec). For a 300-kg spacecraft mass and a disc-shaped sail, the sail radius is about 215 meters.

Assuming a sail areal mass thickness of 1 gm/square meter or 0.001 kg/square meter, the sail mass is 145 kg. Accounting for boom, spars, and connecting tethers, this mass increases to approximately 200 kg. The total payload mass is about 100 kg. Spacecraft mass upon Jupiter encounter is therefore 300 kg. From the teachings of a paper authored by G. L. Matloff and K. Parks, entitled "Interstellar Gravity Assist Propulsion: A Correction and New Application," JBIS, 41, 519-526 (1988), which is hereby incorporated by reference into this application, cruise time in years to Jupiter in a parabolic solar orbit can be estimated as:

$$T_{yr} = 0.077(R_{au})^{3/2}. \quad (2)$$

Since Jupiter is about 5.2 AU from the Sun, the cruise time to Jupiter is approximately 0.9 years and the total flight duration is 1.5 years.

The spacecraft crosses the orbit of the planet Jupiter at solar system escape velocity. Since Jupiter orbits the Sun at 13 km/sec, the spacecraft crosses Jupiter's orbit at about 18.4 km/sec relative to the Sun or a velocity ($V_{s/c}$) of 22.5 km/sec relative to Jupiter.

Probe periapsis velocity relative to Jupiter, $V_{per}$, can be calculated using energy-conservation arguments and the following equation, $$V_{per}=(V_{s/c}^2+V_{jep}^2)^{1/2}=(22.5^2+V_{jep}^2)^{1/2}, \quad (3)$$

where $V_{per}$ is Jupiter's escape velocity at spacecraft periapsis. From the TRW Space Data Handbook, Jupiter's "surface" escape velocity is 59.5 km/sec and the planet's equatorial radius is about 11.2 Earth radii or 71,000 km. At 4.8 Jovian radii (350,000 km from the planet's center), the planetary escape velocity ($V_{jep}$) is 27 km/sec. Substituting this value into Equation (3), the probe's periapsis velocity relative to Jupiter is about 35 km/sec. To enter a very elliptical Jovian orbit, the spacecraft must shed about 8 km/sec from its periapsis velocity.

The spacecraft decelerates over an arc length of about $10^6$ km at an average velocity relative to the planet of about 31 km/sec. The deceleration time is therefore approximately 30,000 seconds or about 9 hours. The average deceleration (change in velocity/change in time) is about 0.3 m/sec$^2$ or 0.03 $g_{earth}$. From the teachings of the G. L. Matloff and L. Johnson paper, AIAA 2000-3338 and entitled "Magnetic Surfing: Reformulation of Lenz's Law and Applications to Spacecraft Propulsion," which is hereby incorporated by reference into this application, a 10-km electrodynamic tether in near-Jupiter space can experience more than 50 Newtons of thrust, which corresponds to a deceleration of a 150-kg spacecraft of about 0.3 m/sec$^2$. There is much more than enough thrust available from electrodynamic tether-Jovian magnetosphere interaction to affect deceleration. As the 300-kg spacecraft decelerates from 35 to 27 km/sec relative to Jupiter, its kinetic energy relative to the planet decreases by about $3.72 \times 10^{10}$ Joules during 30,000 seconds. The electrodynamic tether must dissipate an average power of about 1.2 megawatts.

Figure 2:
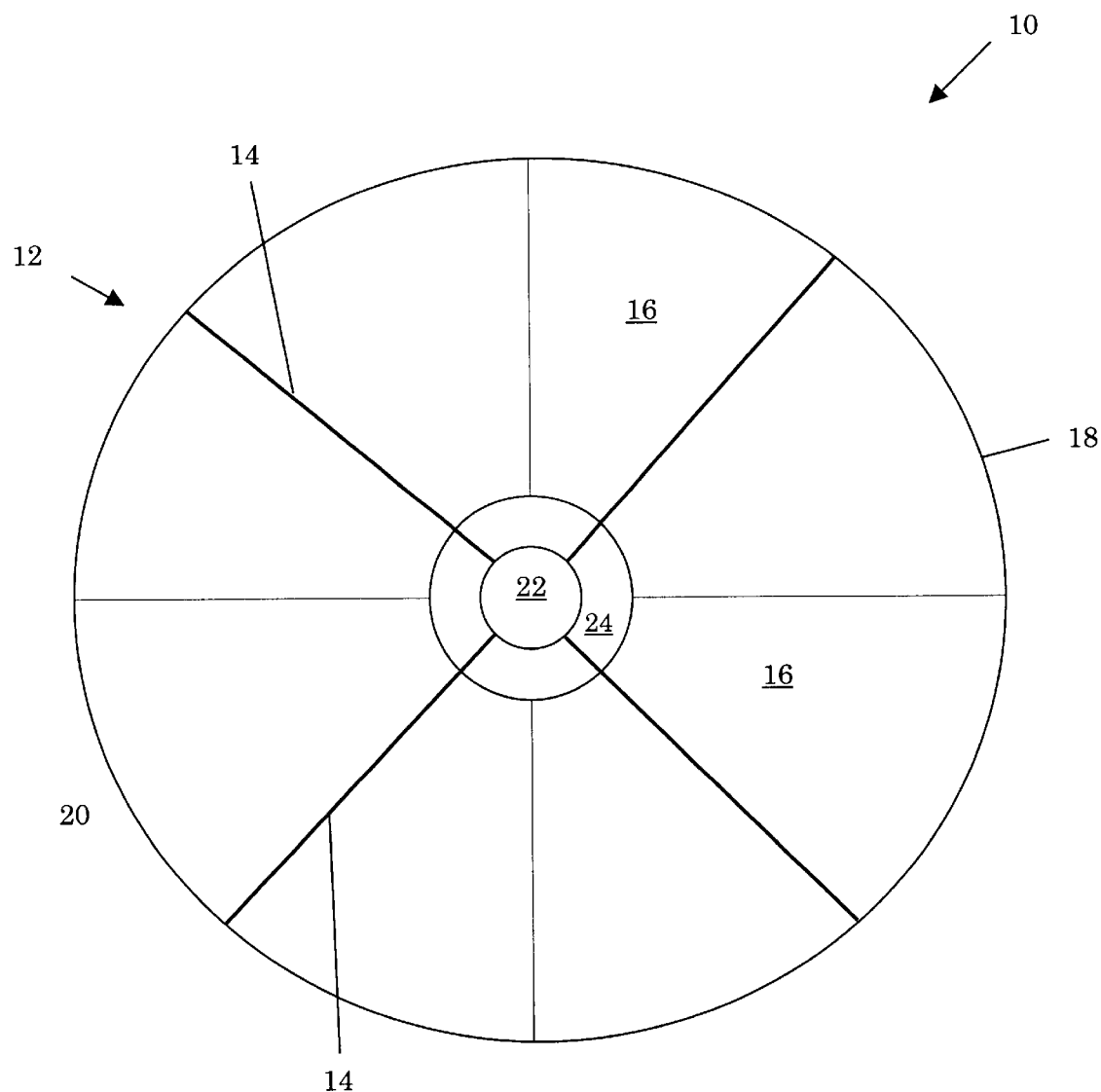
FIG. 2 is a front view of a second embodiment of the present invention having four (4) electrodynamic tethers.

Consider four (4) electrodynamic tethers of 6-km length arranged as shown in FIG. 2. The tether density is that of aluminum (2,700 kg/cubic-meter). If the tether diameter is 1 millimeter, the total tether mass is approximately 50 kg. Assuming that the tether has a circular cross-section, the total tether area is about 75 square meters. The four (4) tethers must radiate at approximately 1.2 megawatts/75 square meters or about 16,000 watts per square meter (1.6 watts per square centimeter). The tether blackbody temperature is about 730 K, well below the melting point of aluminum.

Figure 3:
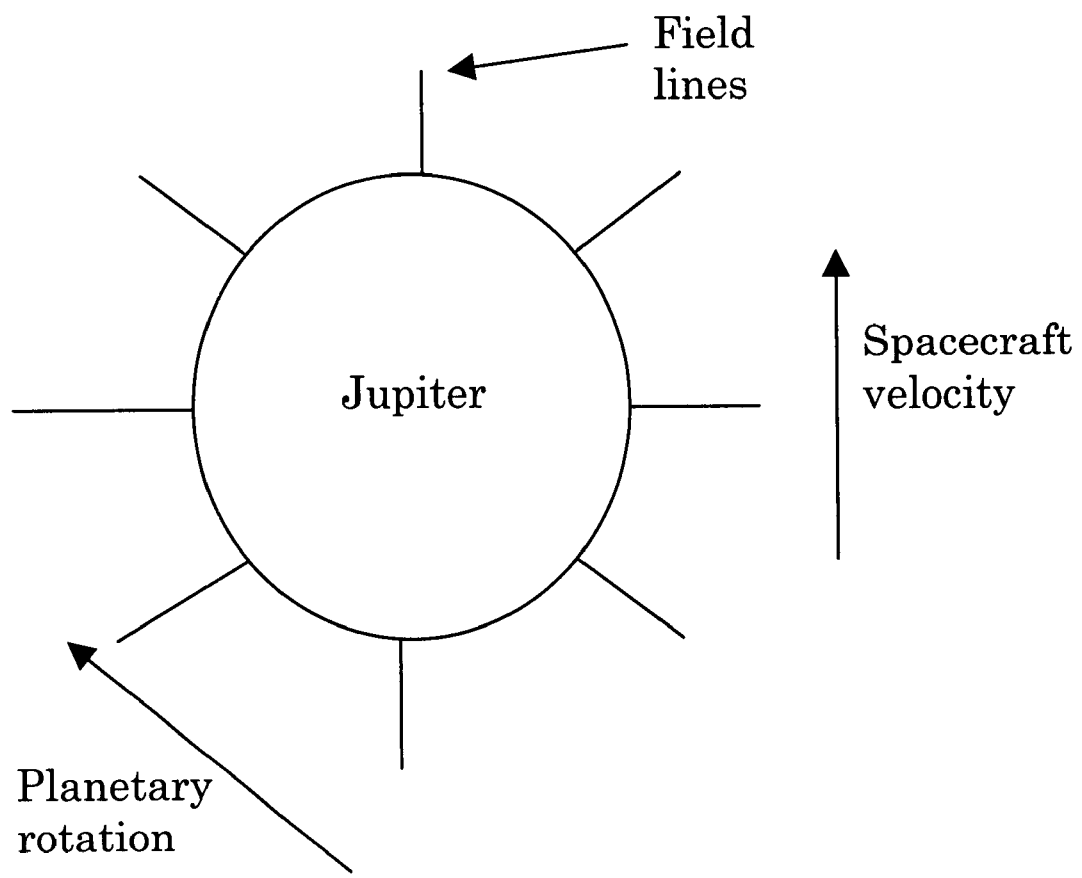
FIG. 3 is a front view of the spacecraft trajectory for decelerating a spacecraft into orbit around a planet using the present invention.
Figure 4:
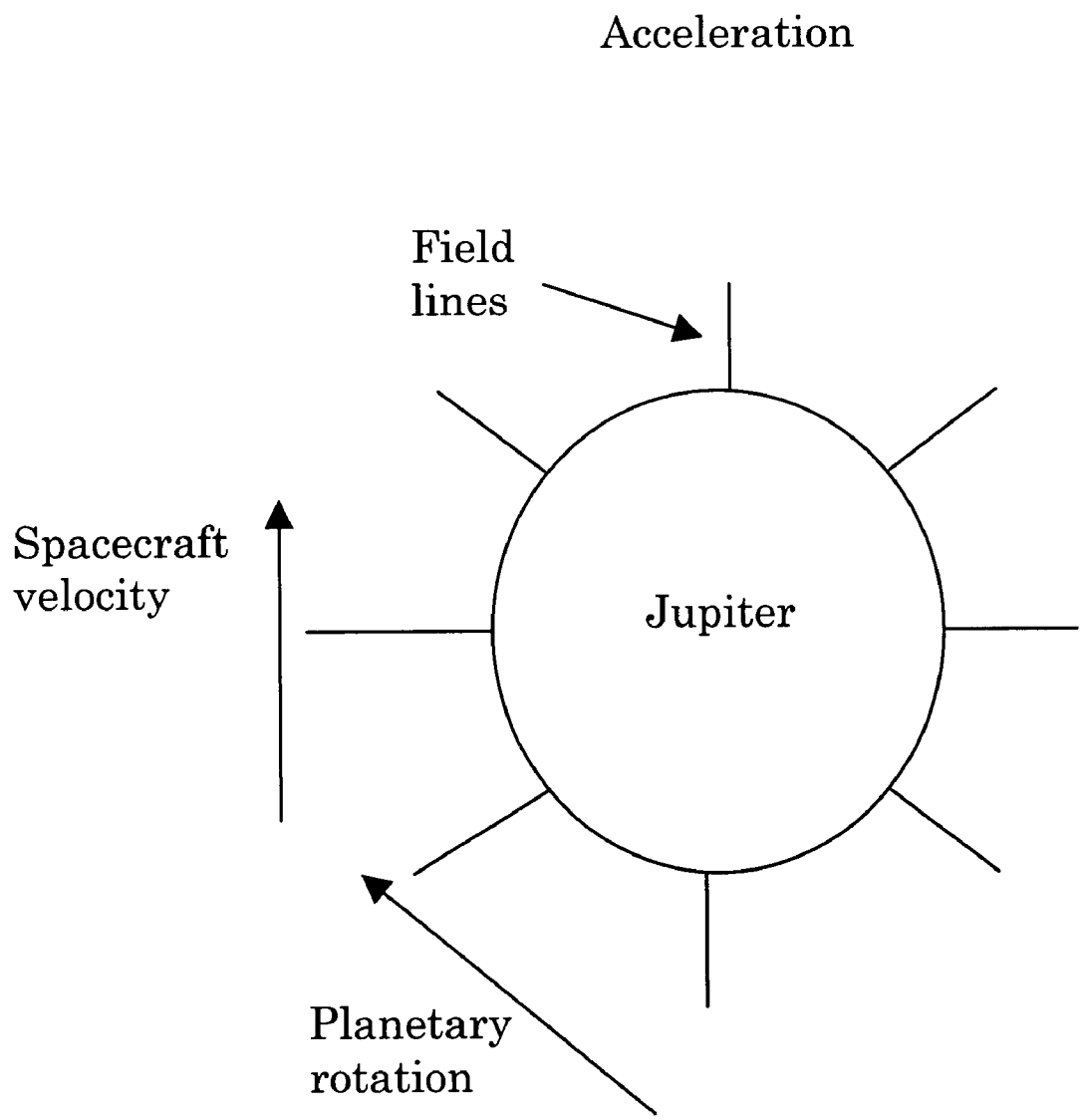
FIG. 4 is a front view of the spacecraft trajectory for accelerating a spacecraft out of orbit around a planet using the present invention.

It should be noted that the electrodynamic tethers could also be used to accelerate the spacecraft out from orbit around Jupiter. In this regard, FIGS. 3 and 4 illustrate spacecraft trajectories for the cases of deceleration and acceleration by the interaction between the Jovian magnetosphere and the electrodynamic tethers. For the case of acceleration, we apply the following equation from The *Starflight Handbook*, authored by E. F. Mallove and G. L. Matloff, Wiley, New York (1989), which is hereby incorporated by reference into this application, and the paper authored by G. L. Matloff and K. Parks, entitled "Interstellar Gravity Assist Propulsion: A Correction and New Application," JBIS, 41, 519–526 (1988):

$$V_{infinity}=[V_1^2+\Delta V^2+2\Delta V(V_1^2+V_e^2)^{1/2}]^{1/2}, \quad (4)$$

where $V_1$=initial pre-periapsis velocity relative to Jupiter (22.5 km/sec), $\Delta V$=incremental velocity at periapsis (8 km/sec), and $V_e$=escape velocity at periapsis (35 km/sec).

Substituting into Equation (4), we see that the spacecraft moves at a velocity of 35 km/sec relative to Jupiter after its 8-km/sec periapsis acceleration maneuver. Since Jupiter orbits the Sun at 13 km/sec, the spacecraft is moving at a maximum velocity relative to the Sun of 48 km/sec after the periapsis acceleration maneuver.

At the orbit of Jupiter, solar-escape velocity is approximately 18 km/sec. The spacecraft exits the solar system with a hyperbolic-excess velocity of about 30 km/sec or 6.3 AU per year. This is about twice the hyperbolic excess velocity of Voyager. It is sufficient to reach 200 AU in 18 years and 550 AU in 87 years.

Various modifications to the embodiments of the combination solar sail and electrodynamic tether propulsion system 10 of the present invention shown in FIGS. 1–4 may be made without departing from the scope of the present invention. For example, in some embodiments, the length of the electrodynamic tethers 14 may be increased to or decreased, depending on the amount of propulsion to be generated by the tethers 14. In some applications, the electrodynamic tethers 14 may extend out past the outer edges 18 of the solar sail segments 16. In other embodiments, the number of electrodynamic tethers used with the system may increase from six (6) to ten (10) or more or decrease from six (6) to one (1) or two (2).

Thus, although there have been described particular embodiments of the present invention of a new and useful Combination Solar Sail and Electrodynamic Tether Propulsion System, it is not intended that such references be construed as limitations upon the scope of this invention except as set forth in the following claims.

The invention claimed is:

1. A combination solar sail and electrodynamic tether propulsion system, comprising:

a solar sail system for generating propulsion to propel the spacecraft through space using solar photons; and an electrodynamic tether system for generating propulsion to steer the spacecraft into orbit around a planet having a magnetic field using the planet's magnetic field, wherein the electrodynamic tether system is operable to generate propulsion to steer the spacecraft through orbital maneuvers around the planet using the planet's magnetic field, and the tether system is further operable to generate power for the spacecraft using the planet's magnetic field, and wherein the electrodynamic tether system includes a plurality of electrodynamic tethers embedded in the solar sail system.

2. A combination solar sail and electrodynamic tether propulsion system, comprising:

a solar sail system for generating propulsion for the spacecraft using solar photons to propel the spacecraft through space, the solar sail system including a solar sail having a plurality of sail segments connected together forming a central opening; and an electrodynamic tether system for generating propulsion for the spacecraft using a planet's magnetic field to steer the spacecraft into orbit and through orbital maneuvers around the planet, and for generating power for the spacecraft using the planet's magnetic field, the electrodynamic tether system including a plurality of electrodynamic tethers embedded in the solar sail.

* * * * *